(No Model.)

J. N. WHITMAN & T. A. TAYLOR.
GROOVER FOR CHANNELING MACHINES.

No. 277,093. Patented May 8, 1883.

Witnesses
Henry Chadbourn.
E. J. Torrey.

Inventors
James N. Whitman.
and
Thomas A. Taylor
by Alban Andren their atty ately explained the operation of the invention.

UNITED STATES PATENT OFFICE.

JAMES N. WHITMAN AND THOMAS A. TAYLOR, OF BEVERLY, MASS.

GROOVER FOR CHANNELING-MACHINES.

SPECIFICATION forming part of Letters Patent No. 277,093, dated May 8, 1883.

Application filed February 10, 1883. (No model.)

*To all whom it may concern:*

Be it known that we, JAMES N. WHITMAN, a citizen of the United States, residing at Beverly, in the county of Essex and State of Massachusetts, and THOMAS A. TAYLOR, a citizen of Great Britain, now residing at Beverly, in the county of Essex and State of Massachusetts, have jointly invented certain new and useful Improvements in Groovers for Channeling-Machines; and we do hereby declare that the same are fully described in the following specification and illustrated in the accompanying drawings.

This invention relates to improvements in grooving-tools or groovers for channeling-machines for boots and shoes; and it consists in improvements in the tool-holder in which the grooving-tool is adjusted and secured; also, in improvements in the grooving-tool, as well as in the manner for securing the latter to the tool-holder after being properly adjusted, as will hereinafter be more fully shown and described, reference being had to the accompanying drawings, where—

Figure 1:
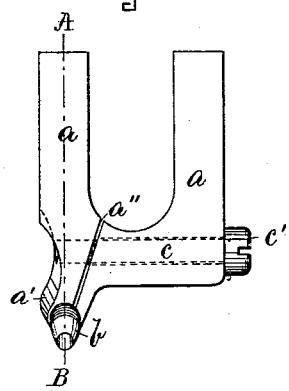
Figure 2:
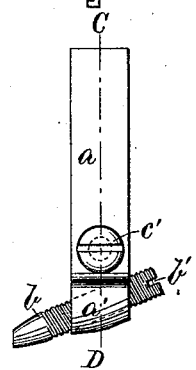
Figure 3:
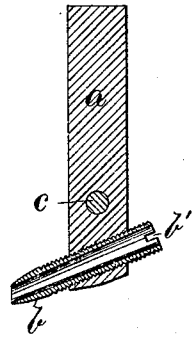

Figure 1 represents a front elevation of the invention. Fig. 2 represents an end view. Fig. 3 represents a vertical section on the line A B shown in Fig. 1, and Fig. 4 represents a vertical section on the line C D shown in Fig. 2.

Similar letters refer to similar parts wherever they occur on the different parts of the drawings.

Figure 4:
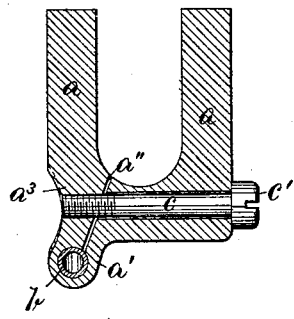

It is very desirable in channeling-machines for making channels in the soles of boots and shoes that the groover or grooving-tool should be capable of a nice and accurate adjustment in the direction of its axis, and that it should be very firmly secured to its tool-holder after being so adjusted; and to accomplish such objects in a simple and durable manner we have constructed our invention as follows:

$a$ represents the tool-holder, preferably made of flat or bar steel with a forked upper end, as shown in Figs. 1 and 4, so as to be adapted to be secured by means of a suitable set-screw or equivalent device to the head of the channeling-machine, as usual.

$a'$ is a downward projection on the holder $a$, which projection has a perforation made through it for the reception of the hollow groover $b$, as shown. The interior of the perforation in the projection $a'$ is made screw-threaded or corrugated, corresponding with the screw-thread or corrugations on the exterior surface of the hollow groover $b$. We prefer to provide the exterior of the groover $b$ with a helical screw-thread, and to make a corresponding female screw-thread in the perforation through the projection $a'$, as by this means the groover $b$ may be adjusted forward and back in relation to the holder $a$ simply by turning said groover $b$ one or more revolutions around its axis, which may be done by means of a common screw-driver or similar tool, for which purpose a notch or recess, $b'$, is made in the rear end of said groover $b$, as shown in Figs. 2 and 3.

For the purpose of firmly securing the groover $b$ to the holder $a$ after it has been adjusted, the invention is carried out as follows: A slit, $a''$, is made through the projection $a'$ from the upper part of its perforation, as shown in Figs. 1 and 4, and through the horizontal portion of the holder $a$ is made a perforation through which the clamping-screw $c$ passes, as shown in Figs. 1 and 4. We prefer to screw the clamping-screw $c$ into the female screw-thread $a^3$ to the left of the slit $a''$, and to allow the said screw to pass loosely through the remainder of the holder $a$, and to provide the clamping-screw $c$ with a suitable round or polygonal head, $c'$, in its opposite end, as shown in Figs. 1, 2, and 4; but this is not essential, as we may to equal advantage allow the said clamping-screw to pass loosely through the whole of the horizontal part of the holder $a$, and to provide said screw with a head on one end and a suitable nut on the other, or in a similar or equivalent manner, our main object being to produce a means by which the slitted projection $a'$ may be closed firmly around the exterior of the groover $b$.

The operation of adjusting and securing the groover $b$ to the holder $a$ is as follows: If it is desired to adjust the groover $b$ after it has been secured to its holder, we unscrew the clamping-screw $c$ sufficiently to allow the groover $b$ to be moved forward or back in the direction of its axis. This may be done by turning it round one or more turns, in case it is screw-threaded and the perforation in the projection $a'$ is correspondingly screw-threaded; but if such parts are corrugated the groover $b$ is merely moved forward or back one or more corrugations, and after being so adjusted it is firmly secured to the holder $a$ by tightening up the clamping-screw $c$, which causes the slitted projection $a'$ to be firmly contracted onto the groover $b$, and when so secured the latter cannot move laterally nor longitudinally in relation to its holder until the clamping-screw $c$ is released in its hold on the expansive holder $a$.

Having thus fully described the nature, construction, and operation of our invention, we wish to secure by Letters Patent and claim—

The combination of the holder $a$, having slit $a''$ and internally screw-threaded or corrugated projection $a'$, with the externally screw-threaded or corrugated hollow groover $b$, and the clamping-screw $c$ for securing the groover and holder together after being adjusted, substantially in a manner as set forth.

In testimony whereof we have affixed our signatures in presence of two witnesses.

JAMES N. WHITMAN.
THOMAS A. TAYLOR.

Witnesses:
ALBAN ANDRÉN,
JENNIE P. WHITMAN.